March 25, 1969  I. H. FRIEDMAN, JR  3,434,291
THRUST TERMINATION APPARATUS FOR SOLID PROPELLANT ROCKET MOTORS
Filed April 4, 1967

Isidore H. Friedman Jr. INVENTOR.

BY

ATTORNEY

United States Patent Office 3,434,291
Patented Mar. 25, 1969

3,434,291
THRUST TERMINATION APPARATUS FOR SOLID PROPELLANT ROCKET MOTORS
Isidore H. Friedman, Jr., Huntsville, Ala., assignor to Thiokol Chemical Corporation, Bristol, Pa., a corporation of Delaware
Filed Apr. 4, 1967, Ser. No. 628,484
Int. Cl. F02k 9/04, 1/06; B64c 15/10
U.S. Cl. 60—254                    6 Claims

ABSTRACT OF THE DISCLOSURE

A thrust termination apparatus for solid propellant rocket motors that will terminate the thrust of the rocket motor without changing chamber pressure.

BACKGROUND OF THE INVENTION

Field of the invention

There has been a great demand for solid propellant rocket motors that have the ability to have the thrust thereof terminated so that such rocket motors may meet the requirements of many new applications for newly designed rocket motors, missiles etc. The cancellation of the thrust being achieved after the rocket motor has been ignited and a change in the trajectory of the rocket motor is found to be necessary for the rocket motor to complete the operational mission for which it has been designed.

The instant invention was therefore conceived to meet these requirements in a positive and efficient manner.

Description of prior art

Many structures have been devised for terminating the thrust of a solid propellant rocket motor, but such systems have been plagued with the disadvantages of being overweight, too complex to produce or manufacture within a reasonable amount, or the efficiency of these systems have been such that motor failure or rocket explosions have resulted that have prevented the rocket motor from accomplishing its required operation.

SUMMARY OF THE INVENTION

This invention, therefore, was developed and relates to thrust termination apparatus for solid propellant rocket motors and more particular to an apparatus that will terminate the thrust of the rocket motor without changing the chamber pressure of the rocket motor, a very important feature in enabling the rocket motor to achieve its operational requirements.

The problem of thrust termination with liquid propellant rocket motors was simple, because by the manipulation of a valve or a series of valves, the supply of liquid to the combustion chamber could be terminated and thus the thrust of the rocket motor could likewise be terminated.

However, with a solid propellant rocket motor, once the propellant has been ignited, there is no way of terminating the supply of the propellant, as in a liquid propellant rocket motor and the one way of controlling the solid propellant rocket motor was to nullify the thrust thereof. Some solid propellant rocket motors have used auxiliary nozzles wherein the thrust has been diverted in a reverse manner to the main exhaust stream of the rocket motor, thus the solid propellant would continue to burn, but the thrust of the rocket motor was divided in opposite directions and if the reverse thrust of the rocket motor was not greater than the main stream of the rocket motor, very little, if any, effect would be had on the trajectory and subsequent range of the rocket motor.

It is an object of the invention, therefore, to provide an apparatus that will accomplish, under proper control, the closure of the throat area of the nozzle of the solid propellant to terminate thrust and simultaneously open a plurality of ports to exhaust the gases of the rocket motor, while at the same time maintaining the same chamber pressure within the rocket motor.

Other objects, features and advantages of the instant invention will, it is believed, be apparent to those skilled in the art from the following detailed description when taken in conjunction with the accompanying drawing in which:

DETAILED DESCRIPTION OF THE INVENTION

Figure 1:
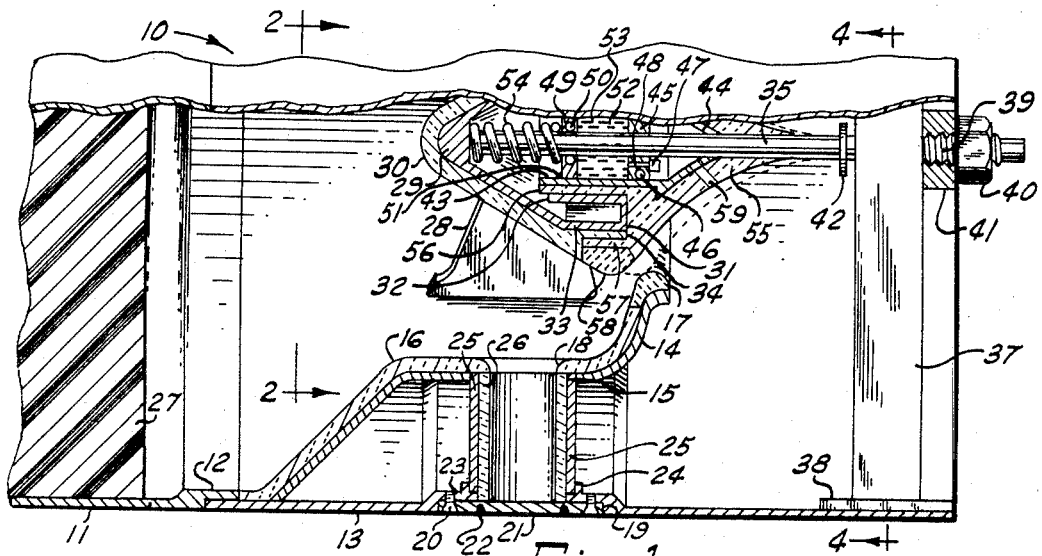
FIGURE 1 is a partial longitudinal sectional view, partly broken away, of a thrust termination apparatus embodying the invention.
Figure 2:
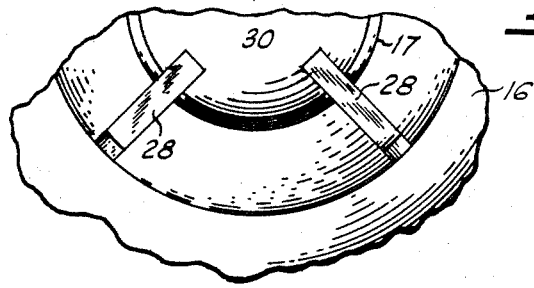
FIGURE 2 is a fragmentary elevational view, partly broken away, taken on the line 2—2 of FIGURE 1.

Referring more in detail to the drawing wherein like parts are designated by like reference numerals, the reference numeral 10 is used to generally designate a rocket motor.

The rocket motor 10 includes a motor case 11 having a reduced annular flange 12 on which is mounted and secured thereto a cylindrical nozzle skirt 13.

Mounted in the nozzle skirt 13 and secured thereto is a nozzle 14 having a plurality of ports 15 therein and a nozzle insulation insert 16 is bonded to the interior of the nozzle 14 and conforms in configuration therewith. The insert 16 at the aft end thereof has a graphite ring 17 bonded thereto and the fore end of the insert 16 abuts the aft end edge of the annular flange 12 on the motor case 11. The insert 16 is also provided with a plurality of ports 18 that are aligned with the ports 15 in the nozzle 14, but are of smaller diameter than the latter ports for a purpose to be later described.

The wall of the nozzle skirt 13 is provided with a plurality of circular cavities 19 and positioned in each of the cavities 19 and secured therein by a conventional means 20, is a frangible disc 21 which is provided in the outer face thereof with an annular heat or electrically actuated explosive charge 22. Each of the cavities 19 at the center thereof is provided with a port 23 and spaced therefrom, in circumjacent relation thereto, is a perpendicular annular flange 24. There is a tubular sleeve 25 that has one end thereof inserted into the port 15 in the nozzle 14 and the opposite end thereof is engaged by the flange 24 and the sleeve 25 is rigidly secured in this position by any well-known means. Bonded to the inner surface of the sleeve 25, with one end abutting the insert 16 and alined with the port 18 and the opposite end seated within the flange 24, is a tubular insulation insert 26, thus each of the ports 18 in the insert 16 is alined with the ports 23 in the cavities 19, as shown in FIGURE 1.

As is conventional, the motor case 11 has a solid propellant grain 27 positioned therein and the exhaust gases, created by the burning of the solid propellant grain 27, pass outwardly of the nozzle 14 though the graphite ring 17.

Mounted in the nozzle 14, adjacent the open aft end thereof by means of a plurality of integral supports 28 that are rigidly secured to the inner surface of the nozzle 14, is a hollow conical-shaped housing 29 and bonded to the outer surface thereof is a cover of insulation 30 that conforms to the configuration of the housing 29. The base edge of the housing 29 is bent back upon itself to provide a substantially U-shaped formation 31 and the inner leg 32 of the U-shaped formation 31 is slightly longer than the outer leg 33 to form a bearing surface, as will be later described, and the aft edge 34 of the covering 30 is elongated and bonded to the outer surface of the outer leg of the U-shaped formation 31.

Extending from the fore end of the housing 29, from a point adjacent to the inner surface of the apex of the housing 29, is a rod 35 which extends toward the aft end of the nozzle skirt 13 longitudinally of the housing 29 to be secured in an aperture 36 in a substantially I-shaped support 37. The flanges 38 at the outer ends of the support 37 are contoured to conform to the configuration of the nozzle skirt 13 and are rigidly secured thereto adjacent to the aft end thereof. The aft end of the rod 35 is threaded as at 39 and a nut 40 is threadably mounted thereon with a washer 41 mounted on the rod 35 intermediate of the support 37 and the nut 40 and a movement limiting disc 42 is secured to the rod 35 forwardly of the support 37.

Mounted on the rod 35 prior to its positioning within the housing 29 is a hollow tubular isentropic plug 43 having a conical-shaped hollow aft end 44 and a first disc 45 is rigidly mounted on the rod 35 and slidably engages the inner surface of the hollow plug 43. The periphery of the disc 45 has an O-ring 46 mounted therein to provide a leakproof engagement between the disc 45 and the plug 43 and a squib operated valve 47 is mounted in the disc 45 to close the port 48 therein.

A second disc 49 is slidably mounted on the rod 35 forwardly of the first disc 45 and an O-ring 50 mounted therein engages the rod 35 to provide a leakproof engagement between the disc 49 and the rod 35 and the disc 49 is rigidly secured at 51 to the inner surface of the plug 43.

The first disc 45 is spaced from the second disc 49 to form a chamber 52 therebetween which is filled with a suitable trapped fluid 53.

Mounted on the fore end of the rod 35 and compressed between the inner surface of the apex of the housing 29 and the disc 49 is a coil spring 54 which urges the disc 49 against the trapped fluid 53.

An insulating cover 55, similar to the cover 30 on the housing 29, is mounted on the plug 43 and is substantially conical in formation to conform to the shape of the conical-shaped end 44 of the plug 43 and is provided with an inner circular flange 56 that is positioned intermediate of the plug 43 and the innner leg 32 of the U-shaped formation 31 on the housing 29 and an outer circular flange 57 that engages the aft edge 34 of the covering 30 that is bonded onto the outer leg 33 of the U-shaped formation 31 and a graphite ring 58, similar to the ring 17, is mounted on the flange 57 forwardly of and adjacent to the ring 17. A port 59 in the cover 55 communicates with the interior of the hollow aft end 44 of the plug 43 for a purpose to be later described.

In the operation of the apparatus the plug 43 and its associated ports are assembled on the rod 35 and the rod 35 is then connected to the support 37 and the plug 43 is then positioned in the housing 29 and the flanges 38 are in place to be rigidly secured to the nozzle skirt 13, as shown in FIGURE 1.

It is to be understood that the fluid 53 is in the chamber 52 and is thus forcing the discs 45 and 49 apart so that a space exists between the rings 17 and 58, as shown in FIGURE 1.

Figure 3:
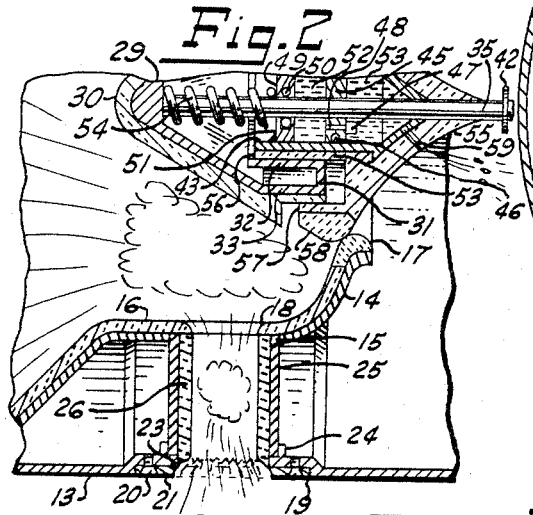
FIGURE 3 is a fragmentary sectional view, partly broken away and similar to FIGURE 1, showing the nozzle throat closed and ports exhausting the exhaust gases from a rocket motor.
Figure 4:
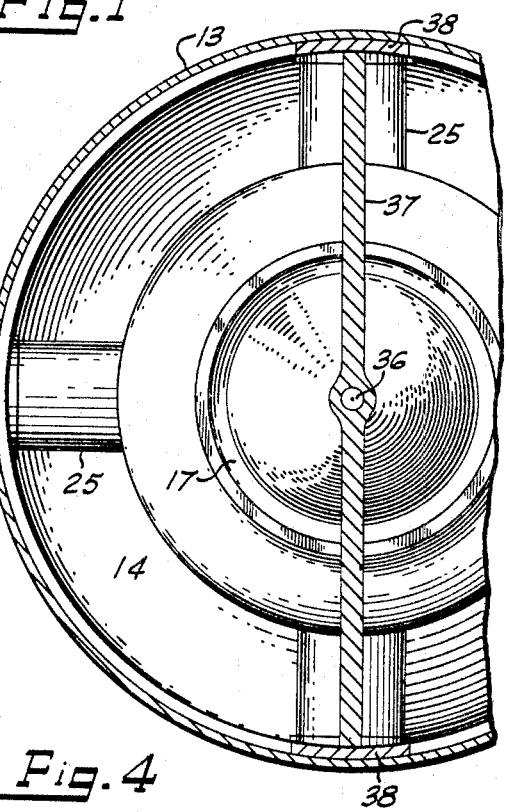
FIGURE 4 is a fragmentary view, partly in section, partly in elevation and partly broken away and taken on the line 4—4 of FIGURE 1.

It is to be understood that the squib operated valve 47 may be actuated by an onboard control or a ground control so that after the rocket motor 10 is in flight, the valve 47 may be actuated to permit the trapped fluid 53 to bleed outwardly of the chamber 52 through the port 48 into the hollow aft end 44 of the plug 43 and outwardly thereof by means of the port 59 in the cover 55, as shown in FIGURE 3. This will permit the spring 54 to urge the housing 43 toward the aft end of the nozzle shirt 13 at a controlled rate and cause the rings 17 and 58 to engage, as shown in FIGURE 3, and prevent any exhaust gases created by the burning of the solid propellant grain 27 to exhaust through the nozzle 14.

Simultaneously with the operation the charge 22 will be ignited, rupturing the disc 21 and the ports 23, which are perpendicular to the center line of the rocket motor 10, will be open to exhaust the same mass flow as is created by the exhaust gases escaping through the nozzle 14. Thus the chamber pressure of the rocket motor 10 will be maintained, the thrust of rocket motor 10 will be terminated and a thrust value of zero will be obtained.

With the thrust of the rocket motor 10 terminated, the trajectory of the rocket motor 10 will be changed and the rocket motor 10 will accomplish its desired operational requirements.

There has thus been provided an apparatus for terminating the thrust of a solid propellant rocket motor, while at the same time maintaining the chamber pressure thereof constant and it is believed that the structure and mode of operation of the invention will be clear to those skilled in the art, it also being understood that variations in the structure and mode of operation of the apparatus may be adhered to providing such variations fall within the spirit of the invention and the scope of the appended claims.

Having thus described the invention what is claimed as new and desired to be secured by Letters Patent is:

1. In a thrust termination apparatus for a solid propellant rocket motor including a motor case providing a combustion chamber therein and an exhaust nozzle communicating with said combustion chamber and having an open aft end for the escape of combustion gases from said combustion chamber, the improvement comprising a nozzle skirt mounted on the aft end of said motor case and containing said exhaust nozzle therein, an insulating cover bonded to the interior surface of said nozzle and having a first graphite ring bonded to the aft end thereof, a plurality of port members extending between said skirt and said nozzle, a frangible closure for each of said port members, means for rupturing each of said closures, a first fixed hollow housing mounted in said nozzle adjacent the open aft end thereof, a second hollow housing mounted in said first housing for longitudinal movement therein, an insulation covering for said second housing having a second graphite ring thereon, the contact of said first and second graphite rings terminating the escape of the exhaust gases through the open aft end of said nozzle to terminate the thrust of said rocket motor, fluid means in said second housing to restrain said first and second graphite rings from contacting each other, means for releasing said fluid means, means for urging said first and second graphite rings into contact with each other after the release of said fluid means, and whereby when the means for rupturing said frangible closures has been actuated the exhaust gases in said nozzle will escape through said port members to maintain the pressure in said combustion chamber constant and maintain the thrust of said solid propellant rocket motor at zero.

2. The improvement as in claim 1, wherein a rod is mounted in said first housing for the mounting of said second housing therein, and means is mounted on said rod to provide a chamber for containing said fluid means.

3. The improvement as in claim 2, wherein a support for said rod is mounted in said skirt adjacent the aft end thereof.

4. The improvement as in claim 2, wherein one of the means mounted on said rod is fixed thereto and the second of said means is fixed to said second housing and the means for urging said first and second graphite rings into engagement with each other comprise a coil spring mounted on said rod and engaging the means fixed to said second housing.

5. The improvement as in claim 3, wherein the means fixed to said rod has a port therein and the means for releasing said fluid comprises a squib actuated valve mounted in said port.

6. The improvement as in claim 5, wherein a port is provided in said second housing for the release of said fluid means therefrom.

References Cited

UNITED STATES PATENTS

| 2,850,976 | 9/1958 | Seifert | 60—254 XR |
| 2,944,390 | 7/1960 | Keathley | 60—254 |
| 3,293,855 | 12/1966 | Cuttill et al. | 60—254 XR |
| 3,302,400 | 2/1967 | Mangum. | |

CARLTON R. CROYLE, *Primary Examiner.*

U.S. Cl. X.R.

60—229; 239—265.25